United States Patent [19]
Guidetti et al.

[11] Patent Number: 5,645,381
[45] Date of Patent: Jul. 8, 1997

[54] VARIABLE-SPLIT BLOWDOWN COAL FEED SYSTEM

[75] Inventors: Robert Henry Guidetti, Redondo Beach; Douglas Bruce Sheppard, Torrance, both of Calif.

[73] Assignee: TRW Inc., Redondo Beach, Calif.

[21] Appl. No.: 304,987

[22] Filed: Sep. 13, 1994

[51] Int. Cl.$^6$ .................................... B65G 53/56
[52] U.S. Cl. ................... 406/156; 406/173; 406/181; 110/104 R; 137/561 A; 137/861; 251/121
[58] Field of Search .................... 406/154, 155, 406/156, 168, 173, 175, 181, 182, 183, 197, 198; 110/104 R; 137/561 A, 861; 251/121

[56] References Cited

U.S. PATENT DOCUMENTS

| | | | |
|---|---|---|---|
| 1,913,675 | 6/1933 | Kerr | 406/181 |
| 3,204,942 | 9/1965 | Matthys et al. | 266/182 |
| 4,027,920 | 6/1977 | Wennerstrom | 406/181 |
| 4,413,935 | 11/1983 | Smith et al. | 406/181 |
| 4,436,459 | 3/1984 | Caldwell | 406/181 |
| 4,536,104 | 8/1985 | Büngert | 406/183 |
| 4,607,987 | 8/1986 | Kice | 406/173 X |
| 4,832,539 | 5/1989 | Wolfe et al. | 406/181 |

*Primary Examiner*—Andrew C. Pike
*Attorney, Agent, or Firm*—Michael S. Yatsko; Ronald M. Goldman

[57] ABSTRACT

A variable-split blowdown coal feed system supplies two streams of air entrained pulverized coal in a uniform, well-metered steady state manner. Splitter dampers control a split of a coal and air mixture into two streams which are fed to respective cyclones operated in the blowdown mode. The cyclone's exhausts are connected in common to a manifold through which a blowdown damper controls the air-to-coal ratio in the air entrained pulverized coal streams that are expressed from each cyclone's discharge.

8 Claims, 2 Drawing Sheets

VARIABLE-SPLIT BLOWDOWN COAL FEED SYSTEM

BACKGROUND OF THE INVENTION

This invention relates generally to pneumatic transport and distribution systems that supply multiple streams of air-entrained particles and, more particularly, to flow splitters for splitting a stream of air-entrained pulverized coal or other pulverulent material.

Pneumatic transport and distribution systems are widely used for supplying streams of air-entrained pulverized coal to a steam generator or blast furnace. In a direct-fired, coal-powered steam generator, a mill continuously grinds coal, while heated sweep air is used to dry the coal and transport the pulverized coal to a coal feed system. The mill sweep air supplies the air flow for transporting the pulverized coal to the coal feed system and also for injecting and mixing the coal with combustion air in the generator's combustors. The coal feed system divides the coal and transport air into multiple streams of air-entrained coal particles for the combustors. These streams of air and coal are generally uniform and nonvarying during combustor operation.

However, for coal to continue to be used as a source of energy, further reductions in the emissions of nitrogen oxides ($NO_x$), sulfur dioxide ($SO_2$), and ash particulates will be required in order to satisfy environmental concerns. The ability to burn a wider range of coals, such as high-ash, low-heat-value types of coal, will also be necessary. U.S. Pat. Nos. 4,217,132 and 4,586,443 disclose a two-stage pulverized-coal combustor that is designed specifically to provide performance improvements in these areas. The two-stage combustor includes a precombustor and a slagging combustor. The precombustor utilizes between 20% to 45% of the coal flow to provide a hot flow of combustion products and air to the slagging combustor, where they are combined with the remainder of the coal flow. In the slagging combustor, all of the coal is gasified under fuel-rich conditions, with a high percentage of the coal ash being removed as liquid slag. These fuel-rich conditions help reduce nitrogen oxide emissions, while high combustion intensities and mixing control help reduce carbon monoxide emissions. Limestone is introduced at the combustor exit to generate a highly-reactive calcined lime which is captured and used in a back-end spray-dryer absorber system for removal of sulfur dioxide emissions.

This highly-efficient two-stage combustor requires a coal feed system that can provide good coal flow stability, since combustion intensities are in excess of four times the level of conventional combustors. The coal feed system must exhaust some of the transport air prior to burning, since injecting all of the sweep air into the combustor degrades its slagging capability and emissions control. The coal feed system must also provide a variable coal split between the precombustor and slagging combustor to accommodate any changes in combustion air temperature. Accordingly, there has been a need for an improved coal feed system for use with this highly-efficient two-stage combustor. The present invention clearly fulfills this need.

SUMMARY OF THE INVENTION

The present invention resides in a variable-split blowdown coal feed system that supplies multiple streams of air-entrained pulverized coal in a uniform, well-metered, steady-state manner without any retention of coal. The coal feed system controls not only the split of the air and coal mixture, but also the air-to-coal ratio of the two air-coal streams. The coal feed system primarily consists of a coal feed splitter, a slagging combustor cyclone, a precombustor cyclone, a vent manifold, and a blowdown damper.

The coal feed splitter splits the coal-air mixture into two streams, one for the slagging combustor cyclone and the other for the precombustor cyclone. In the two discharge ducts of the splitter are the slagging combustor and precombustor splitter dampers. The positions of the splitter dampers adjust the split of the pulverized coal and transport air mixture between the slagging combustor and precombustor cyclones. The cyclones complete the split process by concentrating the coal particles in the coal-air streams. The slagging combustor and precombustor cyclones operate in a blowdown mode. In the "blowdown mode," some of the transport air is allowed to blow down at the bottom of the cyclones with the solid coal particles, while the remaining transport air and some fine coal dust is vented through the vent manifold and blowdown damper.

The split of transport air between the bottom discharge and the vent manifold is adjusted by the blowdown damper, which is positioned in the discharge duct of the vent manifold. Therefore, the splitter dampers control the split of pulverized coal and transport air between the cyclones, and the blowdown damper controls the split of air between the cyclone exhausts and the bottom discharges. The gas exhausts of both cyclones are joined in the common vent manifold to ensure that the two cyclones are pressure balanced, which is required for flow stability.

It will be appreciated from the foregoing that the present invention represents a significant advance in the field of coal feed systems. Other features and advantages of the present invention will become apparent from the following more detailed description, taken in conjunction with the accompanying drawings, which illustrate, by way of example, the principles of the invention.

DETAILED DESCRIPTION OF THE EMBODIMENTS

Figure 1:
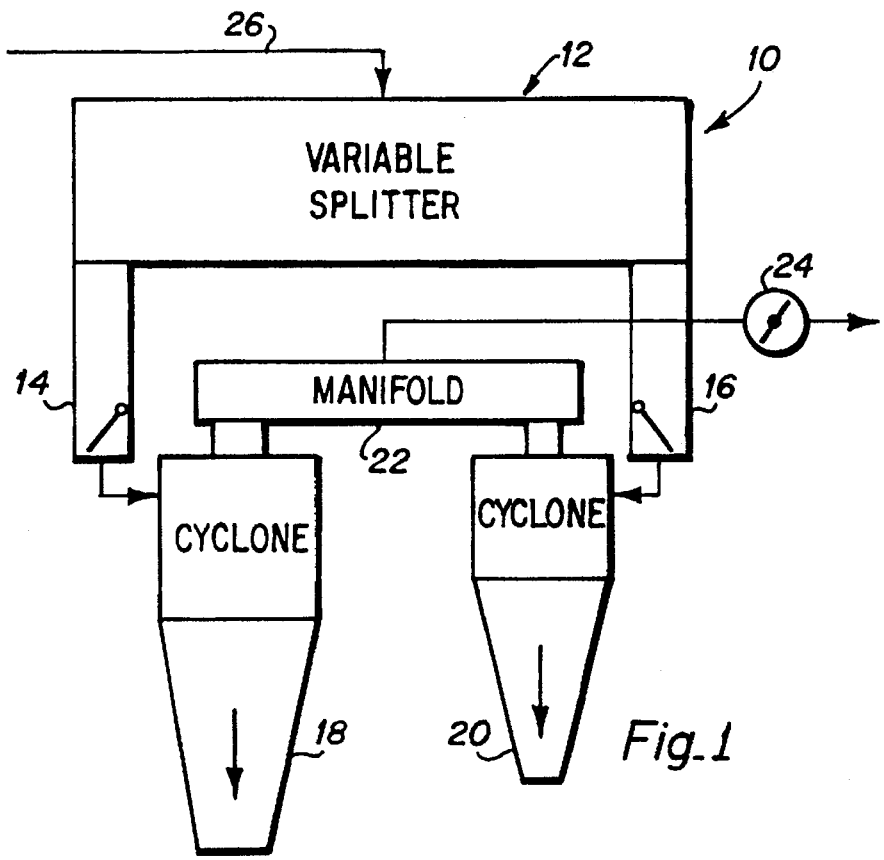
FIG. 1 is a schematic illustration of the variable-split blowdown coal feed system of the present invention.
Figure 2:
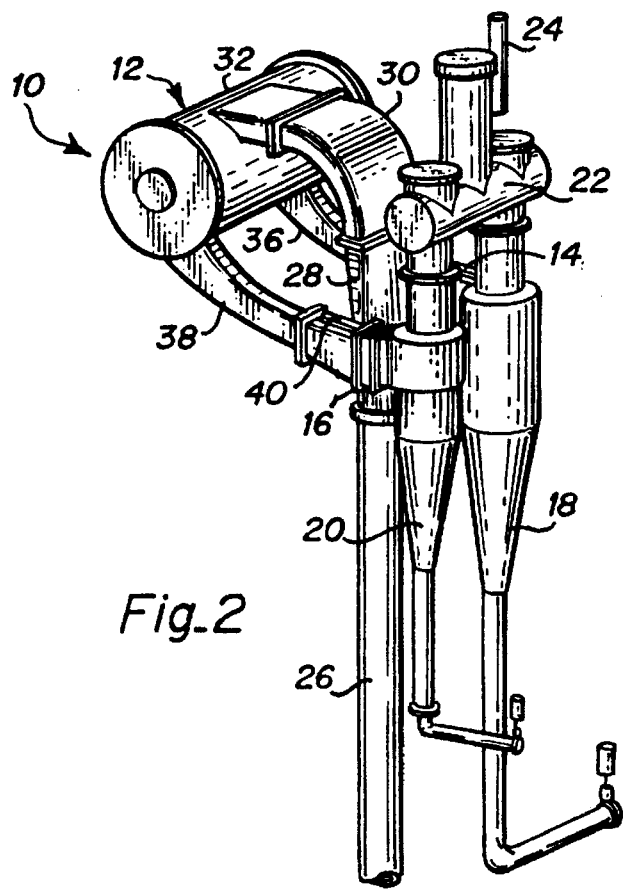
FIG. 2 is a perspective view of the coal feed system of the present invention.

FIGS. 1 and 2 illustrate a variable-split blowdown coal feed system 10 in accordance with the present invention. The coal feed system 10 includes a coal feed splitter 12, a slagging combustor splitter damper 14, a precombustor splitter damper 16, a slagging combustor cyclone 18, a precombustor cyclone 20, a vent manifold 22, and a blowdown damper 24. Pulverized coal and transport air from a mill enter the coal feed system 10 through a coal feed inlet pipe 26. The coal feed splitter 12 splits the coal and air mixture into two streams, one for the slagging combustor cyclone 18 and the other for the precombustor cyclone 20. In the discharge ducts of the splitter 12 are the slagging combustor and precombustor splitter dampers 14, 16, respectively. The positions of the splitter dampers 14, 16 adjust the split of the pulverized coal and transport air mixture between the slagging combustor and precombustor cyclones 18, 20. The cyclones complete the split process by removing a portion of the air to increase the concentration of coal particles in the coal-air streams discharged at the bottom.

The slagging combustor and precombustor cyclones 18, 20 operate in a blowdown mode. In the blowdown mode, some of the transport air is allowed to blow down at the bottom of the cyclones 18, 20 with the solid coal particles, while the remaining transport air and some fine coal dust is vented through the vent manifold 22 and blowdown damper 24. The blowdown mode of the cyclones is to be contrasted with their typical mode of operation in which they completely separate the solid coal particles from the transport air, with the coal particles being discharged from the bottom of the cyclone and all of the transport air and some fine coal dust being exhausted at the top.

The split of transport air between the bottom blowdown and the vent manifold is adjusted by the blowdown damper 24, which is positioned in the discharge duct of the vent manifold 22. Therefore, the splitter dampers 14, 16 control the split of pulverized coal and transport air between the cyclones 18, 20 and the blowdown damper 24 controls the split of air between the cyclone exhausts and the bottom discharges. The gas exhausts of both cyclones are joined in the common vent manifold to ensure that the two cyclones are pressure balanced, which is required for flow stability.

As shown in FIG. 2, the coal feed inlet pipe 26 receives the pulverized coal and transport air from the pulverizing mill and is connected to a circular-to-rectangular transition pipe 28. A pressure of 50 to 60 inches of water is required to operate the coal feed system to overcome the pressure drops through the coal feed system and the combustors. The mill exhaust pressure is about 15 inches of water, thus requiring some sort of pressure boost between the mill and the inlet pipe 26. This can be achieved either by an exhauster fan or by pressurizing the mill. The length-to-diameter ratio of the inlet pipe 26 is at least 10-to-1 to achieve uniform dispersion of the coal and air stream at the transition pipe 28.

The circular-to-rectangular transition pipe 28 transitions from a circular cross section to a rectangular cross section of the same area to minimize flow separation. The pulverized coal and transport air then enters a rectangular inlet elbow 30 which subjects the coal-air stream to a centrifuging action, such that as the flow turns through the 90 degree elbow, the coal particles are concentrated on the top surface of the rectangular elbow so that the stream of coal particles enters along the top inner surface of the coal splitter 12. A uniform distribution of coal particles along this top inner surface is critical for achieving a predictable and accurate coal split. The top inner surface is profiled to help achieve this uniform distribution.

Figure 3:
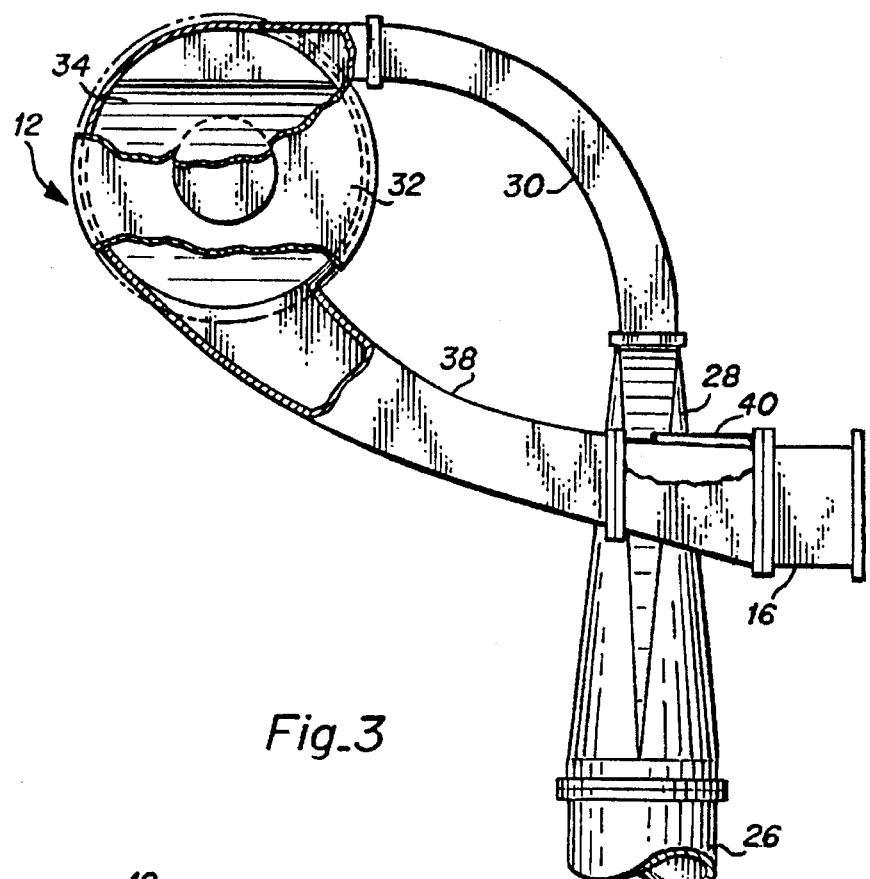
FIG. 3 is a side partially cut away pictorial view of the coal feed splitter of FIG. 4 as taken from the side of the view in FIG. 4 that is represented by line 3—3.
Figure 4:
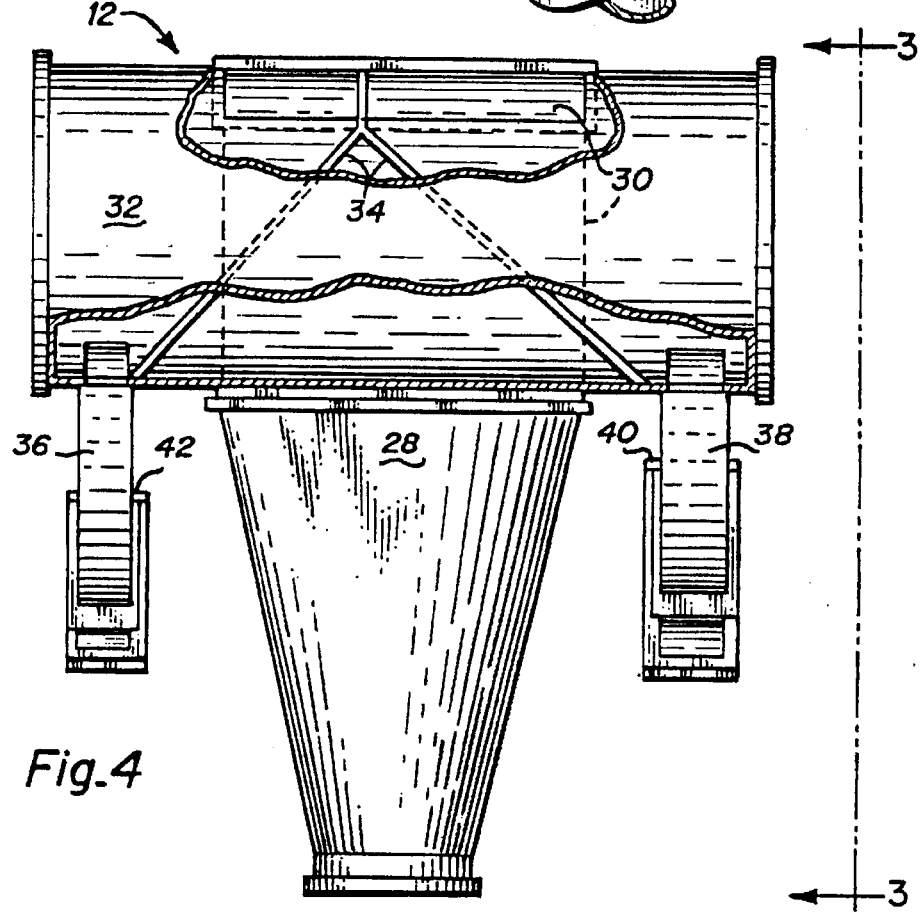
FIG. 4 is a top partially cut away pictorial view of the coal feed splitter used in the embodiment of FIG. 2, drawn to a larger scale, with the side view thereof represented by line 3—3, appearing in FIG. 3.

As shown in FIGS. 3 and 4, the coal feed splitter 12 primarily comprises a cylindrical drum 32 having a triangular-shaped splitter disk 34 positioned axially within the drum 32. The splitter disk 34 divides the coal stream into two streams, one coal stream for the slagging combustor and the other coal stream for the precombustor. The transport air is also split in the same fashion. Although the positions of the splitter dampers 14, 16 provide the primary adjustment of the split ratio of the pulverized coal and the transport air mixture between the slagging combustor and precombustor cyclones 18, 20, the axial position of the splitter disk has a secondary effect on this split ratio. The splitter disk 34 is contoured to avoid coal retention and streamline the coal flow. At one end of the cylindrical drum 32 is an outlet that feeds the slagging combustor coal stream into a slagging combustor splitter discharge duct 36 and at the other end of the drum is an outlet that feeds the precombustor coal stream into a precombustor splitter discharge duct 38. The slagging and precombustor splitter discharge ducts 36, 38 feed their respective slagging combustor and precombustor cyclones 18, 20 through the splitter dampers 14, 16. The splitter dampers 14, 16 are preferably motor driven. They are configured to force the air and coal toward the outer walls of the volute cyclone inlets. This assures a high cyclone efficiency with reasonable pressure losses. A clearance between the bottom of the blades of the dampers and the lower surface of the discharge ducts minimizes coal retention behind the damper blades. The splitter discharge ducts 36, 38 are also contoured to minimize coal retention and, in addition, to minimize their pressure drop. Manual slagging and precombustor discharge duct dampers 40, 42 are installed in the top of the discharge ducts, just upstream of splitter dampers. These discharge duct dampers may be used to accelerate the coal-air streams into the cyclones to prevent coal accumulations from occurring in the splitter dampers.

The variable-split coal feed system of the present invention supplies two streams of air-entrained pulverized coal in a uniform, well-metered steady-state manner without any retention of coal. The coal feed system controls not only the split of coal between the slagging combustor and the precombustor, but also the air-coal ratio of the two air-coal streams entering the slagging combustor and precombustor. The coal feed system of the present invention maintains transport air velocities above a minimum or saltation limit below which coal starts to settle down on the walls and below a maximum limit above which excessive pressure drops and erosion become a problem.

From the foregoing, it will be appreciated that the present invention represents a significant advance in the field of coal feed systems. Although several preferred embodiments of the invention have been shown and described, it will be apparent that other adaptations and modifications can be made without departing from the spirit and scope of the invention. Accordingly, the invention is not to be limited, except as by the following claims.

We claim:

1. A variable-split blowdown coal feed system comprising:

a coal feed splitter for splitting a coal and transport air mixture into two air-coal streams, said coal feed splitter including discharge ducts for said two air-coal streams;

a pair of splitter dampers in said discharge ducts of said coal feed splitter for adjusting a split of said coal and transport air mixture between said two air-coal streams;

a pair of cyclones for respectively receiving said two air-coal streams from said splitter dampers and separating coal from said air-coal streams, each said cyclone including an exhaust for permitting air to exit and a bottom discharge to discharge the coal and each said cyclone operating in a blowdown mode to split air from said air-coal stream into one portion that exits through said bottom discharge with said coal thereof and a remaining portion that exits through said exhaust;

a vent manifold connected in common to said exhaust of each of said cyclones to pressure balance said cyclones; and a blowdown damper coupled to said vent manifold for controlling relative split of the portions of the air between said exhausts and said bottom discharges.

2. A variable-split blowdown feed system comprising:

a feed splitter for splitting a pulverulent material and transport air mixture into two streams, said feed splitter including discharge ducts;

a pair of splitter dampers in said discharge ducts of said feed splitter for adjusting a relative split of said pulverulent material and transport air mixture between said two streams;

a pair of cyclones, each said cyclone including an exhaust and a bottom discharge, and each said cyclone operating in a blowdown mode for receiving a respective one of the two streams from the splitter dampers, separating pulverulent material from said respective stream, and discharging said pulverulent material and a portion of air reparated from said respective stream through said bottom discharge and discharging a remaining portion of said air through said exhaust thereof;

a vent manifold connected to the exhaust of each said cyclone, wherein said exhausts of both said cyclones are joined in common to pressure balance said cyclones for enhancing flow stability; and a blowdown damper for controlling relative split of the portions of the air between said cyclone exhausts and the bottom discharges.

3. A feed means for supplying coal particles entrained in transport air to a two-stage combustor, comprising a precombustor and a slagging combustor, from a common supply of coal, said feed means comprising:

a pair of cyclones, each of said cyclones having a bottom;

splitting means for receiving and proportionately splitting the coal particles into first and second streams and feeding said first and second streams to said cyclones, respectively, said cyclones operating in a blowdown mode for exhausting a portion of said transport air while permitting another portion of said transport air to be blown down at said bottom of each respective cyclone together with said coal particles, wherein a first stream of air and coal particles is produced from the bottom of one of said cyclones and a second stream of air and coal particles is produced from said bottom of another of said cyclones; and means for feeding said first stream of air and coal particles from the one cyclone to said precombustor and said second stream of air and coal particles from the other cyclone to said slagging combustor.

4. The feed means for supplying the coal particles entrained in the transport air to the two-stage combustor as set forth in claim 3, wherein said first stream from the one cyclone comprises between 20% to 45% of the air and coal particles in said streams from said cyclones and said second stream from said other of said cyclones comprises a remainder thereof.

5. The feed means for supplying the coal particles entrained in the transport air to the two-stage combustor as set forth in claim 3, wherein said feed means further includes a manifold, said manifold being in communication with each of the cyclones wherein the portion of the transport air that exhausts from each of the cyclones is combined in said manifold and, thereupon, is vented therefrom, whereby pressure in said cyclones is balanced.

6. The feed means for supplying the coal particles entrained in the transport air to the two-stage combustor as set forth in claim 3, wherein said feed means further includes a splitter damper for metering a ratio of air to coal in said first and second streams from said cyclones.

7. A variable-split blowdown coal feed system comprising:

coal feed splitter means for splitting a coal and transport air mixture into two air-coal streams, said coal feed splitter means including discharge ducts;

splitter damper means in said discharge ducts of said coal feed splitter means for adjusting a split of said coal and transport air mixture between said two air-coal streams;

blowdown cyclone means for receiving said two air-coal streams from the splitter damper means and separating coal from said air-coal streams, and discharging the coal from said air-coal streams through bottom discharges and discharging air from said air-coal streams through exhausts and through said bottom discharges; and vent manifold/blowdown damper means for joining said exhausts from both said blowdown cyclone means to pressure balance said blowdown cyclone means and for controlling a split of said air from said air-coal streams between said exhausts and said bottom discharges of said blowdown cyclone means.

8. A variable-split blowdown feed system comprising:

feed splitter means for splitting a pulverulent material and transport air mixture into two streams, said feed splitter means including discharge ducts;

splitter damper means in said discharge ducts of said feed splitter means for adjusting said splitting of the pulverulent material and transport air mixture between said two streams;

blowdown cyclone means for receiving said two streams from said splitter damper means and separating pulverulent material from said two streams, said blowdown cyclone means including gas exhausts and bottom discharges; and vent manifold/blowdown damper means for controlling a relative split of air from said streams between said gas exhausts and said bottom discharges.

* * * * *